(12) United States Patent
Ostrover et al.

(10) Patent No.: US 7,343,347 B2
(45) Date of Patent: Mar. 11, 2008

(54) ELECTRONIC MEDIA PLAYER WITH METADATA BASED CONTROL AND METHOD OF OPERATING THE SAME

(75) Inventors: Lewis S. Ostrover, Los Angeles, CA (US); Steven M. Blumenfeld, Lafayette, CA (US)

(73) Assignee: Time Warner Inc., New York, NY (US)

( * ) Notice: Subject to any disclaimer, the term of this patent is extended or adjusted under 35 U.S.C. 154(b) by 0 days.

(21) Appl. No.: 10/680,899

(22) Filed: Oct. 8, 2003

(65) Prior Publication Data

US 2005/0080743 A1 Apr. 14, 2005

(51) Int. Cl.
*H04K 1/00* (2006.01)
*H04L 9/00* (2006.01)

(52) U.S. Cl. .......................... 705/51; 705/50; 705/57; 705/59

(58) Field of Classification Search .................. 761/51, 761/57, 59; 709/223; 380/201; 370/465; 705/50, 51, 57, 59; 725/119, 134–136; 707/102
See application file for complete search history.

(56) References Cited

U.S. PATENT DOCUMENTS

| | | | | |
|---|---|---|---|---|
| 5,260,999 A * | 11/1993 | Wyman | ........................ | 705/59 |
| 5,673,316 A * | 9/1997 | Auerbach et al. | ............. | 705/51 |
| 5,790,664 A * | 8/1998 | Coley et al. | ................. | 709/203 |
| 5,892,900 A * | 4/1999 | Ginter et al. | ................. | 726/26 |
| 6,028,936 A * | 2/2000 | Hillis | ........................ | 713/168 |
| 6,115,818 A * | 9/2000 | Barton | ........................ | 713/176 |
| 6,226,618 B1 * | 5/2001 | Downs et al. | ................. | 705/51 |
| 6,357,042 B2 * | 3/2002 | Srinivasan et al. | ......... | 725/119 |
| 6,389,467 B1 * | 5/2002 | Eyal | ........................... | 709/223 |
| 6,611,812 B2 * | 8/2003 | Hurtado et al. | ............... | 705/51 |
| 6,697,948 B1 * | 2/2004 | Rabin et al. | .................... | 726/30 |
| 6,718,046 B2 * | 4/2004 | Reed et al. | .................. | 380/201 |
| 6,859,791 B1 * | 2/2005 | Spagna et al. | ................. | 705/51 |
| 7,185,060 B2 * | 2/2007 | Christensen et al. | ........ | 709/206 |
| 2001/0050920 A1 * | 12/2001 | Hassell et al. | ............... | 370/465 |
| 2002/0120925 A1 * | 8/2002 | Logan | ........................ | 725/135 |
| 2003/0074367 A1 * | 4/2003 | Kaler et al. | ................. | 707/102 |
| 2003/0163823 A1 * | 8/2003 | Logan et al. | ................ | 725/134 |
| 2004/0128701 A1 * | 7/2004 | Kaneko et al. | .............. | 725/136 |

FOREIGN PATENT DOCUMENTS

EP 1176490 A2 * 1/2002

OTHER PUBLICATIONS

Video Business, "Strand on the Line With Diux" Netherby, Sep. 10, 2001, V21, Iss 37 p. 30.*
Applied Cryptography, Schneier, 1996.*

* cited by examiner

*Primary Examiner*—Calvin Loyd Hewitt, II
(74) *Attorney, Agent, or Firm*—Gottlieb, Rackman & Reisman, P.C.

(57) ABSTRACT

A method and apparatus is described that prevents viewing or other type of playback of unauthorized copies of media files, whether received through a network or retrieved from a magnetic or optical disc. The apparatus uses data in a metadata field that forms a part of the media files. Viewing or playback is allowed only if the data meets certain predetermined criteria. An apparatus is also provided that can be used to generate a new metadata field if a media file has a metadata field with unacceptable data.

9 Claims, 4 Drawing Sheets

ELECTRONIC MEDIA PLAYER WITH METADATA BASED CONTROL AND METHOD OF OPERATING THE SAME

BACKGROUND OF THE INVENTION

1. Field of Invention

This invention pertains to an apparatus and method for playing electronic media using metadata attached to the media as a control parameter in a manner that prevents unauthorized play of the media.

2. Description of the Prior Art

A. Unauthorized Copying of Media

The advent of digitized media has brought with it the facility for lossless copying of digitized music, television, and movies, and has given even a novice the ability to easily and rapidly transport unauthorized pirated material from one computer or media device to another. Content pirates can acquire content from digital sources like Digital Video Disc (DVD) and Compact Disc (CD), or can simply digitize and compress media from analog sources (e.g. VCRs, cable television, Cassette Tape, LP, etc.) using nothing more than an inexpensive home computer.

Pirating is a tremendous threat to content providers, who spend large amounts of money producing music, films, and other types of programming, and expect to generate revenue from the sale, licensing and presentation of this content in a controlled and protected manner. Although the content providers may choose to sell a copy of a digital recording, there is strong resistance to having unauthorized copies distributed over computer networks, on optical discs, or in other formats.

Content protection systems and Digital Rights Management (DRM) technologies have been developed to combat pirating, but, in many cases, are cracked within weeks or months of their introduction. For example, digital direct broadcast satellite providers like DirecTV and BSkyB have fought a pitched battle against pirates who sell illegal Smart-Cards as well as entire set-top boxes that allow the reception of programming, including premium channels, without paying premium or subscription fees.

More recently, the DVD was introduced. The DVD standard incorporates the Content Scrambling System (CSS) for encryption of audio-visual content. After the commercial release of the DVD, the Content Scrambling System was broken and a software program (DeCSS) to defeat the system was made available on the Internet. The ability to freely copy DVDs is now available to anyone with a personal computer and DVD-ROM drive. Pirated copies of many DVD movies are readily available on the Internet and through the black-market or underground dealers.

B. Metadata

Unlike text-based computer data files, video and audio media are not inherently self-describing in a manner that is easily readable by computers. Self-description is a necessary aid in the classification, indexing, manipulation, filing and playing of data files. To ameliorate this situation, audio and video content is typically augmented with machine readable "metadata". Metadata is generally defined, for the purpose of this patent, as any type of information added to a media file that helps identify or describe an attribute of the media content or is associated with the generation and/or production of the media content.

The metadata typically consists of several data fields, each data field being dedicated or reserved for a particular type of information. Thus, the metadata could include fields dedicated to some fundamental elements of the content such as title, artist, year of production, copyright holder and genre. Metadata fields may also be assigned to more detailed or complex parameters such as the cast and crew of a film, encryption method, equalization parameters, video scaling requirements, recommended decoding buffer size, how the content is best presented, or links to other information or other content.

A number of standards exist for metadata for both audio and video. For example, MPEG-1 Level-3 (MP3) audio files are often labeled (or "tagged") using the de-facto standard called ID3. ID3 is a relatively simple text enhancement to compressed audio files that indicates titles, artists, album names, years, genres, and other descriptive parameters. MPEG-7 is a new international standard (ISO/IEC 15938) for metadata, allowing for a richly detailed description of audio-visual material.

Many other metadata systems (some of which have been standardized) exist. These systems all enable data associated with media content to be authored, stored, transported and associated with the content. The standards do not address how the metadata is managed or how to restore the metadata fields if the content becomes disassociated from the metadata, or how the metadata can be used as a means of controlling the playing of the media. More specifically, the standards do not address the use of metadata to determine whether the media is to be accepted as a bona fide media or rejected as an unauthorized copy.

The media content generally consists of audio and/or video components and is sometimes referred to as 'the payload'. The combination of metadata and the payload is defined herein as a media file having a header, a main body and a trailer. The metadata can be placed in a particular position within the media file (for example, right after an introductory header, or before the trailer). The metadata can also be interspersed or interleaved with portions of the payload. Alternatively, the metadata can also be embedded within the payload.

A player receiving the media file (either as a block of data on a transportable data storage such as a magnetic or optical disc, or received over a network interface in a stream) detects the information from at least some of the fields of the metadata and may use this information to set some of its parameters to insure that the payload is played correctly.

SUMMARY OF THE INVENTION

The present invention provides a means for using metadata for preventing unauthorized copying and/or presentation of media content. In one embodiment, metadata fields that may not be specifically dedicated to copy control or decryption are used to control media playback. In this scenario, if the metadata fields are populated with data that is correctly formatted and acceptable for each of these fields, then playback is permitted. The system can disable content playback if it is determined that certain minimum requirements are not met with respect to at least some of the metadata fields.

More specifically a player constructed in accordance with this invention includes an input that receives the media file, circuitry adapted to receive the playload and to generate corresponding audio and/or video components that are provided to an external play mechanism such as one or more speakers and/or one or more TV monitors or the like. Importantly, the device further includes a controller that analyzes the metadata from the media file and compares it to data stored in a memory and indicative of the correct or expected information for the metadata. This information can be loaded into the memory from a remote location. Alternatively, the controller can analyze the payload, determine various attributes of the payload and then compare these attributes to the metadata. The circuitry generates the component(s) corresponding to the payload only if the controller determines that the data fields of the metadata contain acceptable data.

An apparatus or device is also described that can also be used for replacing an old media file that is not playable because of improper or incomplete data in its metadata fields with a new media file that is playable. The device insures that the metadata of the new media file is appropriately populated by data derived from information based on the payload itself, or from external sources. The device can be used to reconstruct or repopulate the metadata with the appropriate data if the metadata has become, intentionally or unintentionally, corrupted, or the data does not match properly the payload.

This invention has an advantage over use of explicit copy control fields in that it does not rely on a single field, can alter the fields that it uses as a check, and can compare the metadata fields against control metadata to determine if the work is an authorized copy.

In this respect, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and form a part of the specification, illustrate embodiments of the present invention and, together with the description serve to explain the principles of the invention.

DETAILED DESCRIPTION OF THE INVENTION

Figure 1:
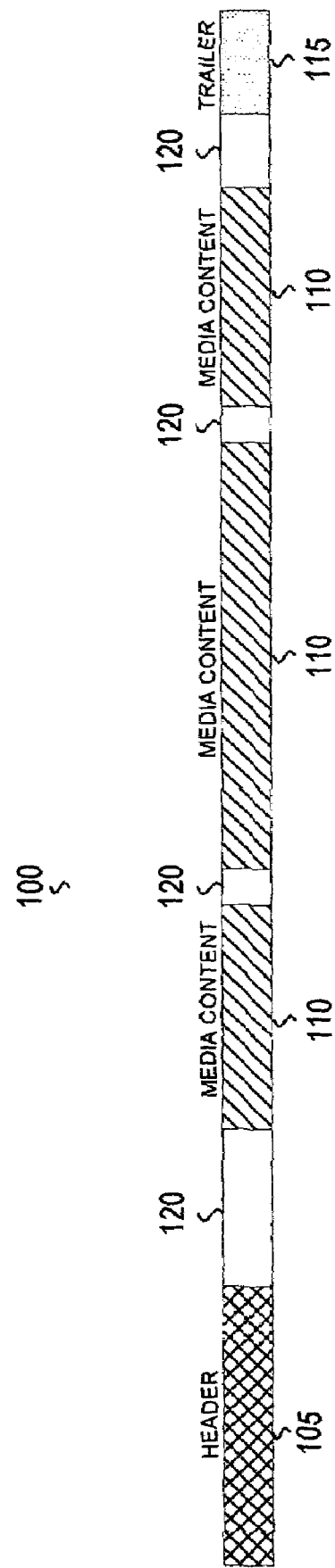
FIG. 1 illustrates a media file incorporating machine-readable metadata.

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

For the purposes of this invention, any electronic media can be considered to be a file incorporating metadata. The term "file" in this context is used in an abstract and general sense, and is not intended to limit applicability to a specific form of digital media format. The file is associated with a carrier that is used as a means of distribution, exchange, transportation or transmission. For example, if the media is broadcast then the carrier is a conventional RF signal. The carrier could also be a tangible object, such as a magnetic disc, a FLASH memory card, an optical disc, a CD, a DVD, etc.

The composition of the file can be varied, dependent on the carrier, the actual content of the media, and various other factors. Typically, an audio-video file includes the media content formed of one or more of the following:

One or more video portions;

One or more audio portions, including for example, dialog in several languages;

Text, including closed caption, subtitles in one or more languages, etc;

Metadata;

The first three portions form the components of the media program that is to be played and can be referred to as the payload. The metadata provides various types of information about the payload. The following table illustrates some typical metadata entries, each corresponding to a data field of the metadata:

| METADATA | |
|---|---|
| REPERTOIRE LEVEL DATA | |
| ALBUM NAME | BETHOOVEN'S SYMPHONY NO. 10 |
| RECORD LABEL | WARNER BROTHERS |
| PROGRAM ATTRIBUTES | |
| SIZE | 4122000 |
| FILE TYPE | RA |
| VERSION LEVEL DATA | |
| VERSION ID | 12345 |
| VERSION TYPE | THEATRICAL |
| STOCK | SONY |
| MEDIA TYPE | DIGIBETA |
| CREATED | Jan. 3, 2002 |
| COLOR/BW | COLOR |

Additional fields may include additional information, related for example to the repertoire data, such as director, genre, author, producer, actors, etc. Other entries in the metadata may include characteristics associated with either the audio or the video portions of the payload. For example, the metadata may include fields that indicate the presence of close captions, subtitles (including choices of one or more languages and what these languages are), the number of camera angles, the format of the image (i.e., letter box or full screen), etc. Information related to the audio component could include the language or languages in which the dialog is available, whether the sound is provided on a single channel, stereo, 5.1 or 6 channels, etc.

A Media File 100 is illustrated in FIG. 1. As discussed above, the Media File 100 may be stored on magnetic or optical media, streamed through a wired, optical, or wireless computer network, or broadcast via a terrestrial or satellite radio network, etc. Although portions of the Media File 100 may be encrypted to prevent unauthorized copying or playback, the descriptions and illustrations show an unencrypted form of the file. This is done for the purpose of clarity only, and is not meant to suggest that the file must be unencrypted. Media File 100 includes Header 105, Media Content and payload 110, and Trailer 115. Header 105 and Trailer 115 serve to identify the bounds of the file and may also contain identifying and addressing information. As discussed above, Media Content 110 includes one or more types of digitized media, including digitized audio, digitized video, and digitized still images. Some or all of the digitized media within Media Content 110 may be compressed to reduce storage space or transmission bandwidth requirements. Media Content 110 is typically designed to be decoded and converted to analog form for presentation to a human viewer or listener and is not typically in a form such that its meaning (semantic content) is readily comprehensible by a computer or other consumer device. Metadata 120 is incorporated into Media File 100 to provide machine-readable descriptions that aid in the classification, indexing, manipulation and filing of Media File 100. Metadata 120 also provides information that maybe useful to the viewer/listener and enhance the viewing and/or listening experience. As illustrated in FIG. 1, Metadata 120 may precede, succeed, or be interspersed, or may be even embedded within Media Content 110 so that it is not readily discernible.

The metadata may be formatted using XML (the eXtensible Markup Language), a standard mark-up language developed by the World Wide Web Consortium (W3C). Those skilled in the art will readily comprehend that any standard or proprietary method may be used to format the metadata fields.

Figure 2:
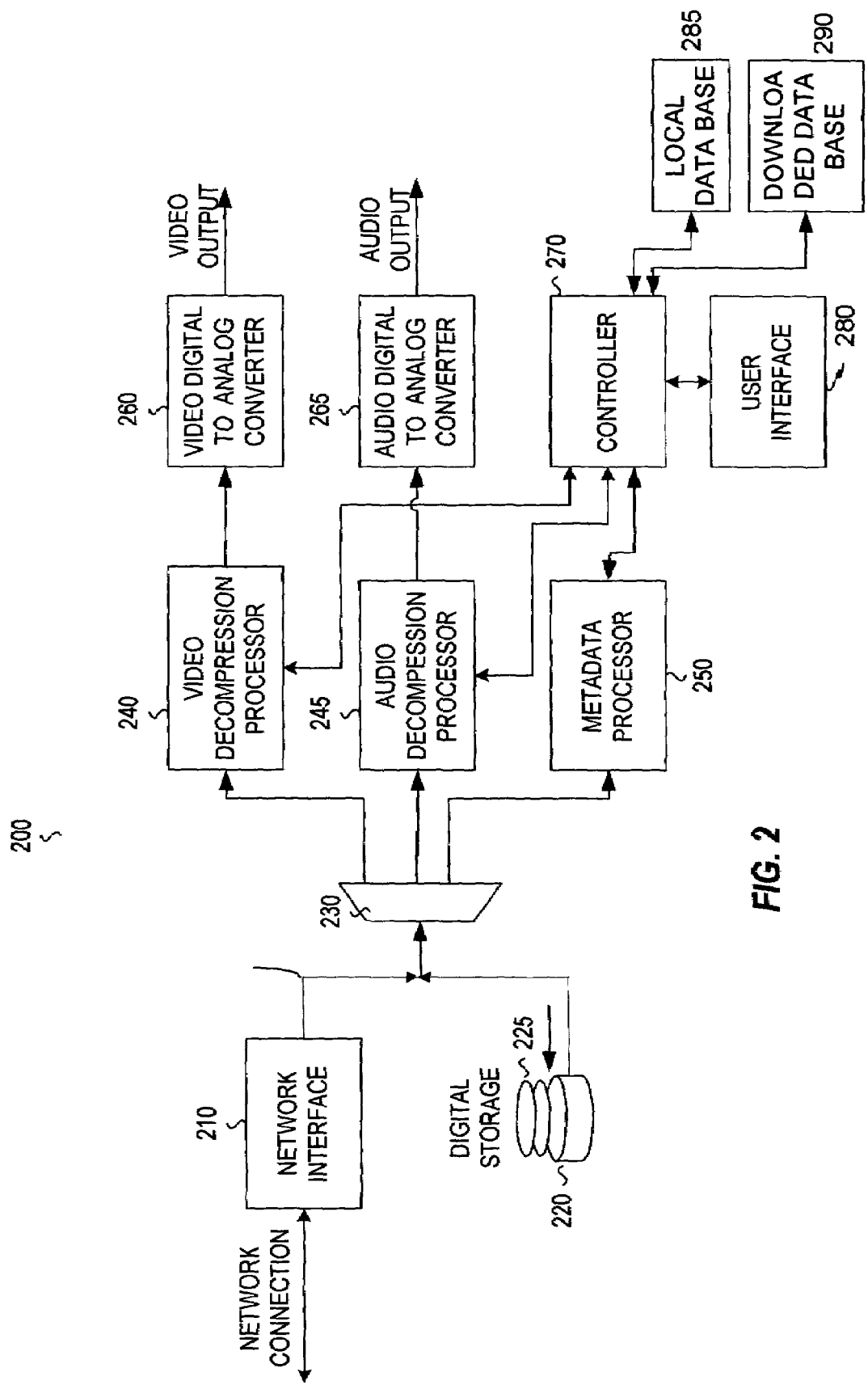
FIG. 2 is a functional-level block diagram of a media player that incorporates an embodiment of the invention.

The player used to play the payload from the Media File 100 can be a stand-alone device (e.g., CD players, DVD players, Set-Top Boxes, etc.), a personal computer, a set-top box or terminal, and so on. FIG. 2 is a functional block diagram of a Player 200 which uses the metadata to enable or disable playback of Media File 100. Player 200 supports both digital video and digital audio. As one skilled in the art would recognize, a similar illustration and description, with appropriate alterations, could apply to a digital audio only player, or any other type of player suitable for the reproduction of the payload any a form suitable for presentation to the customer. Player 200 incorporates a Network Interface 210, Digital Reader 220, Internal Digital Storage 225, or any combination of these. The Media File 100 can be received either as a streaming data over the network interface 210 or can be retrieved from the digital storage 210. Alternatively, the Media File 100 can be presented on a magnetic or optical disc that is inserted into and then read by the Reader 220.

The Demultiplexer 230 parses File 100 and separates the video, audio and metadata data components. The digital video data is processed by Video Decompression Processor 240, the digital audio data is processed by Audio Decompression Processor 245, and the metadata is processed by Metadata Processor 250. The decompressed video is selectively fed into Video Digital to Analog Converter 260, producing a video output suitable for display on a television or video monitor (not shown). The decompressed audio is selectively fed into Audio Digital to Analog Converter 265, producing an audio output suitable for presentation on a television or audio system (not shown). Metadata Processor 250, working in conjunction with Controller 270, examines the metadata from the digital media file. Controller 270 makes a decision, based on the results of the examination of the Metadata, to either allow or prohibit presentation of the digital media file, as described in more details below. In other words, the controller 270 determines whether the outputs of processors 240 and 245 should be enabled or not.

The Controller 270 is responsive to commands from a user through the user interface 280 and generates the commands and other signals necessary to operate the Player 200. In addition, the controller inspects one or more of the metadata fields to determine if the content of the Media File 100 corresponds to the data in the fields. This inspection can be performed at several levels of sophistication, with a corresponding level of complexity. At the lowest level, the controller 270 checks the spelling of various words within certain designated fields. It is highly unlikely that the title or data from other fields is misspelled.

Another test that can be performed by the controller 270 is an internal consistency check by decompressing small portions of the audio and/or video components and comparing the characteristic of these portions to the corresponding characteristics defined in the metadata. For example, a pirated Media File 100 can be generated from an authorized file by playing the authorized file, capturing the audio and video components of the output, recording these analog outputs, digitizing the recordings and assembling the digitized signals with the metadata from the authorized file. However, the data of some of the fields in the metadata do not correspond to the characteristics of the audio and visual components of the payload. For example, during the process, the following characteristics associated with the video and audio components may have changed, or lost altogether:
Color
Close caption
Subtitles
Image size
Dialog in secondary languages
Camera Angles
Secondary Sound Channels
Total file size
Media type.

This last entry relates to the carrier from which the current File 100 has been obtained. For example, the pirated File may be received via the network connection either directly, the file may have been downloaded in the digital storage 220 and then retrieved. However the original File may have been recorded on a DVD. Therefore the metadata field labeled media type indicates a DVD. The controller could determine whether the file has been received from a DVD or electronically from other sources. If the metadata indicates that a DVD carrier but the file 100 has been received through a network connection, or vice versa, then it is assumed that the file 100 has been pirated and no replay is allowed.

At another level, the Controller 270 may determine if the actual elements listed in the metadata are correct. This test may be accomplished by comparing the content of each field with information from a local data base 285. The local data base 285 could be preloaded with a table containing the correct metadata for the authorized File, including all the elements discussed above. The Controller 270 then compares the elements of the metadata with the corresponding values stored in the table of the local data base 285. If significant differences exist between the data in the fields then the Media File 100 is pirated and the controller 270 does not allow it to be played, as discussed in more detail below.

In a different embodiment, the controller checks the elements of the metadata with a table from a downloaded data base 290. This table (or at least some of the elements of a metadata) is obtained by contacting a remote site through the network interface and downloading data therefrom. For example, the metadata and/or one of the data bases may contain web address (URL) of a site that contains information of a File categorized by title, artist, composer, version, etc. The controller can then access this remote site and obtain the metadata associated with a particular version. The metadata includes all the elements for that particular version and once downloaded, the controller can compare the data so obtained with the data from the metadata of Media File 100.

In another embodiment, advanced metadata checks are performed, in addition to those mentioned above. Advanced metadata checks could include the calculation of a checksum across some or all metadata fields (a checksum calculated, for example, by summing all character values modulo 256), calculating a CRC (Cyclic-Redundancy-Check) across some or all metadata fields (two well know CRCs are the CRC-16 and CRC-32, specified in ITU-T V.42 and ISO 3309), looking for hidden authorization codes distributed among the metadata fields.

Of course, the controller 270 may use any of the tests discussed above, or two or more of the tests.

As discussed above, if it is determined that the metadata is substantially correct, playing of the content can be authorized and an enable signal sent to the appropriate decoder or presentation part of the digital media player system. If, however, it is determined that the metadata is substantially different from the original metadata of the work, playing can be disabled through halting of decryption or decoding, disabling of another part of the system, or by removing that work from the display of titles available for playback.

Figure 3:
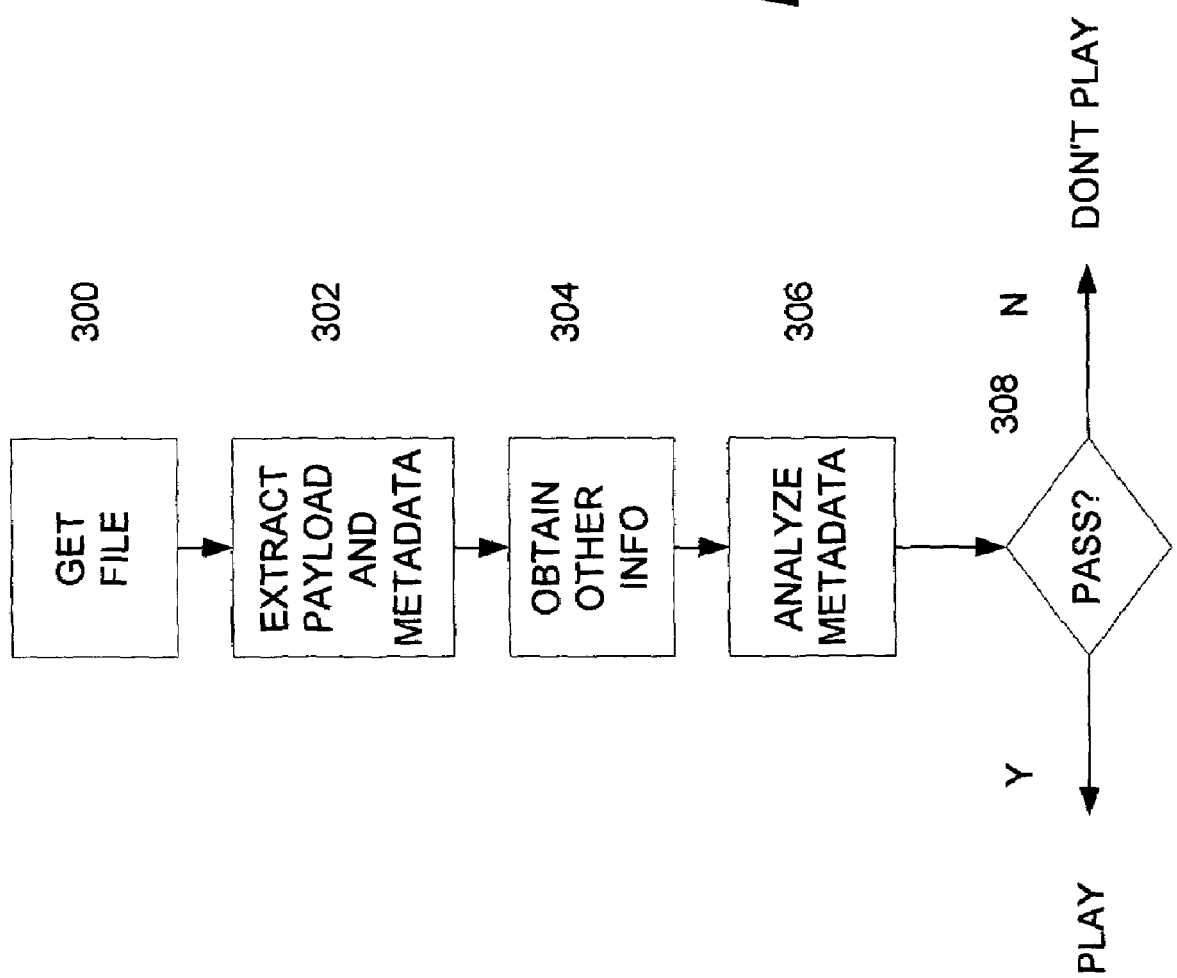
FIG. 3 shows a flow chart of the operation of the player of FIG. 2.

In summary, the controller performs one or more tests designed to distinguish a pirated media file from an authorized media file. These tests include inspecting the elements of metadata themselves, comparing the elements with the elements of the metadata associated with known authorized files, stored either locally or obtained from a remote site, and/or obtaining the characteristics of the payload of the file and comparing these characteristics with the metadata elements. The steps of operation of player 200 are shown in FIG. 3. In step 300 the Media File 100 obtained and stored from one of the sources discussed above. In step 302 the Media file is parsed or stripped from the File 100. In step 304 other information is collected either internally from the Media File 100, or the internal data base, or externally, i.e., from a remote site. As part of this process, portions of the audio and/or video components are decoded, if necessary. In step 306 the gathered information and the metadata are analyzed. In step 308 a comparison is made between the characteristics of the media file 100 and the corresponding elements of the metadata. If there is a match, the player proceeds with the extraction and processing of the payload to generate the audio and video components. Otherwise, the payload is not processed.

The controller is preprogrammed to perform a test of step 308 that can have various levels of complexity. A relatively simple test consists of merely checking if there is any data in a metadata field at all. If data is detected, the test passes. If no data is found, the test fails. Another test consists of checking the title entered into the respective metadata field. In the example given above the title of album is incorrect and if this title is checked against a local or remote data base, the test fails. Another check that can be performed is to look for in the Vertical Blanking Interval (of the payload includes a video signal) for Close Caption signals. If no such signals are detected and if the appropriate field of the metadata indicates that Close Caption should be presented, the test fails. Another, and somewhat elaborate test assumes that the producer of the content on Media File 100 maintains a remote data base in which various attributes of at least Media File 100 are retained and are indexed using various means, such as, for example the Version Number. Some of these attributes may include whether the payload is an audio or video presentation, whether in addition to a program, such as a musical piece selection, additional information about the composer, orchestra, conductor, soloist, etc. Further data could include an identification of the carrier on which the content is recorded. For example, the subject content may have been originally recorded on a CD For this test, the controller 270 obtains the Version Number from the metadata, retrieves the information from the remote location, stores it in the downloaded data base and then compares it with the attributes of the payload. If one or more items do not agree, for example, if the carriers do not match, the test fails. For example, a payload consisting of an MPG streaming video could be associated with metadata including the number of bytes, the number of frames and a parameter defining the carrier. The controller can check all these parameters and allow playing of the payload only if all these parameters are correct. If any of these parameters is incorrect, the playback is not played. For example, the playback is not played if information in the metadata shows a carrier other than a streaming video, or the number of bytes or frames is 1% higher or lower than the expected number.

Figure 4:
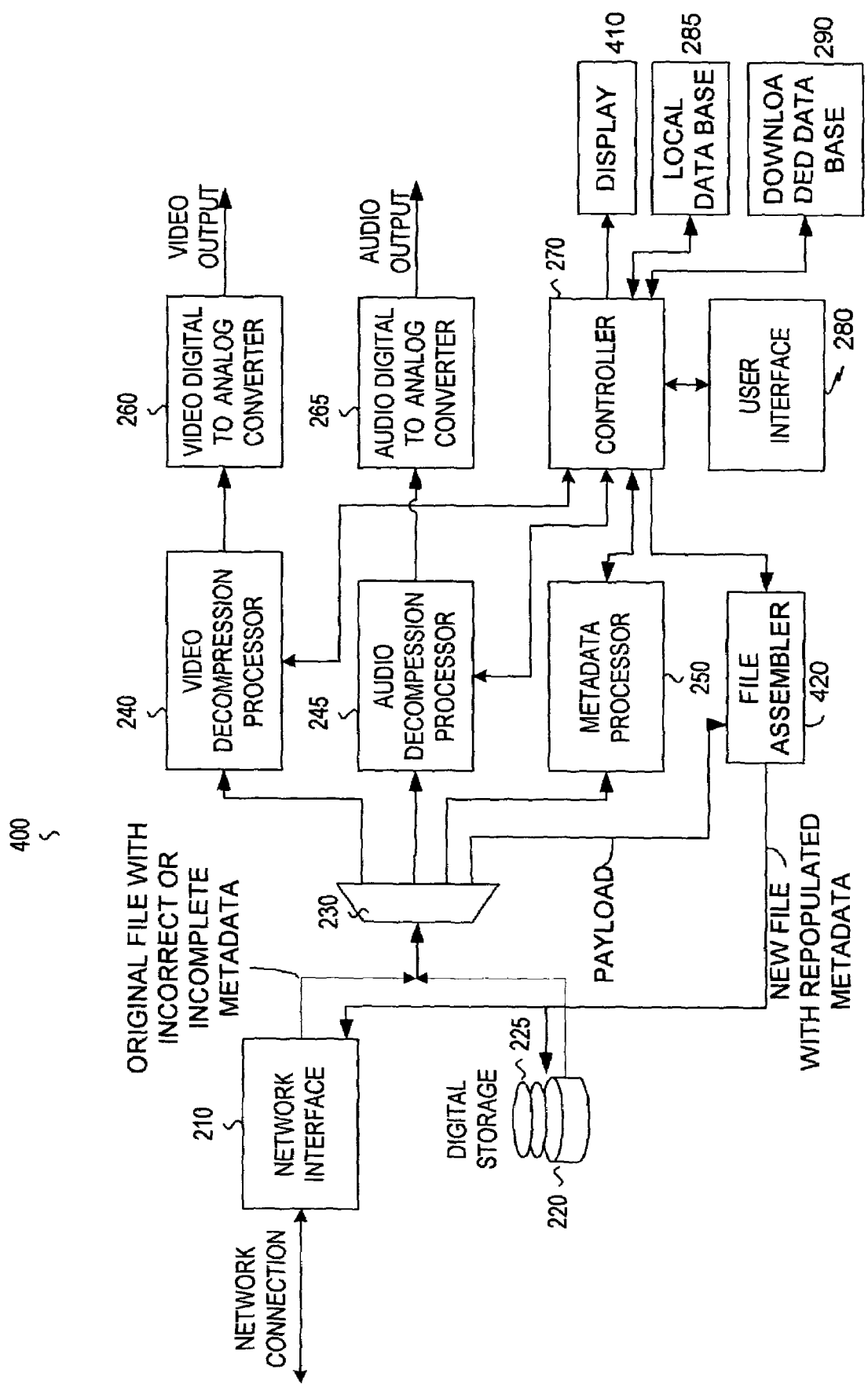
FIG. 4 shows a functional-level block diagram of an apparatus for re-generating or recreating metadata.

A further aspect of the present invention pertains to a method and apparatus for populating the metadata with the proper information. This may be necessary if the original metadata is corrupted, incorrect or incomplete for some reason. The apparatus 400 for performing this function, shown in FIG. 4, has some of the same components as the player 200. The apparatus 400 further includes a display 410 and a file assembler 420.

Apparatus 400 may operate in two different modes. In one mode, the user does not have access to an authorized Media File. In this mode, the File 100 is decomposed by the demultiplexer 230 and the metadata processor 250 detects the information from the metadata and sends it to the controller. The controller 270 shows the metadata information on the display 410, or generates an output by some other means. For example, the controller can arrange the metadata into a table and print it. The user then reviews this information and determines whether any of the elements of the metadata need to be inserted, changed or updated. As part of this process, the user may have the controller decode portions of the audio and video components so that the user can examine these components and determine what corrections, if any, are needed in the corresponding metadata elements. For example, the metadata may indicate that the media file 100 has subtitles, however, no subtitles are found in the media file 100. For this entry, the user then corrects the metadata to indicate that no subtitles are present. The user can also have the various entries in the metadata checked to determine if they are correct. As part of this process, the controller can retrieve appropriate data either from the local data bas 285 or the remote database 290. The user can insert new data in the fields in which data is missing or incorrect. For example, the user can correct mistakes in the title.

In some cases, the data in a metadata field may match the data from the remote site, however, it may not be correct for the respective file. For example, the original file may have been recorded on an optical disc, and an appropriate entry is made in the respective metadata field. However, the file being checked could have been downloaded from through the network interface. Therefore, the field indicating the carrier is incorrect and the user can correct it to indicate the appropriate media.

In the second mode of operation, the user has both an original and a copy of the media file 100. The user obtains the metadata from the original media file and its copy, compares the two, and then adjusts the entries of the metadata of the copy based on information from the metadata of the original.

Alternatively, if the user does not have the original media file, he may obtain information related to the metadata for this file from a remote cite and downloaded it into the download database 290. He then uses this information to correct the metadata or even generate a new one.

Once the controller 270 completes making the changes in the metadata (or generating a new one), the file assembler 420 combines the same with the payload thereby forming a new media file with a correct metadata and the original payload. When this new media file is fed to the player of FIG. 2, the player will recognize it as an authorized file.

The many features and advantages of the invention are apparent from the detailed specification. Thus, the appended claims are intended to cover all such features and advantages of the invention that fall within the true spirit and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

We claim:

1. A player for playing content from a media, comprising:
   an input receiving said media, said media including a digital file comprising a media component having at least one component characteristic and a metadata portion including a parameter descriptive of said component characteristic, said parameter being selected from the group consisting of at least color, close caption, subtitles, image size, dialog, camera angles, and secondary sound channels;
   electronic circuitry that converts the digital file into corresponding signals for playing the content corresponding to said digital file, said electronic circuitry being enabled by a play signal; and
   a decompressor that decompresses a portion of said media component from said digital file, wherein said portion constitutes only a fraction of said digital file; and
   a comparator that detects said component characteristic from the decompressed digital file portions compares the detected component characteristic to the parameter and generates said play signal based on said comparison.

2. The player of claim 1 wherein said digital input includes a network interface receiving said digital media file from a remote network.

3. The player of claim 1 wherein said digital input includes a digital data storage.

4. The player of claim 1 wherein said digital input includes a removable digital data storage.

5. A method for controlling the playback of content comprising:
   decompressing a portion of a media component, said media component having at least one component characteristic, and a metadata portion including a parameter descriptive of said component characteristic said parameter being selected from the group consisting of color, close caption, subtitles, image size, dialog, camera angles, and secondary sound channels, wherein said portion forms only a fraction of said media component;
   determining said component characteristic from said decompressed portion;
   retrieving said parameter from said metadata;
   comparing said parameter to the determined component characteristic; and
   playing said content based on said comparison.

6. The method of claim 5 wherein the determined component characteristic exactly matches said parameter.

7. The method of claim 5 wherein the determined component characteristic matches said parameter within a prespecified limit.

8. The method of claim 5 wherein said media component pertains to one of an audio and a video component of said content.

9. The method of claim 5 wherein said media component pertains to one of an audio and a video component of said content.

* * * * *